US012277715B2

(12) United States Patent
Huang et al.

(10) Patent No.: US 12,277,715 B2
(45) Date of Patent: Apr. 15, 2025

(54) TRACKING SYSTEM, TRACKING METHOD AND NON-TRANSITORY COMPUTER-READABLE STORAGE MEDIUM

(71) Applicant: HTC Corporation, Taoyuan (TW)

(72) Inventors: Chiao-Chien Huang, Taoyuan (TW); Fang Yu Cheng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 364 days.

(21) Appl. No.: 17/652,482

(22) Filed: Feb. 24, 2022

(65) Prior Publication Data

US 2023/0041519 A1 Feb. 9, 2023

Related U.S. Application Data

(60) Provisional application No. 63/260,069, filed on Aug. 9, 2021.

(51) Int. Cl.
| | |
|---|---|
| *G06T 7/246* | (2017.01) |
| *G06F 3/01* | (2006.01) |
| *G06F 3/03* | (2006.01) |
| *G06F 3/0346* | (2013.01) |

(52) U.S. Cl.
CPC .............. *G06T 7/246* (2017.01); *G06F 3/017* (2013.01); *G06F 3/0308* (2013.01); *G06F 3/0325* (2013.01); *G06F 3/0346* (2013.01); *G06F 3/0304* (2013.01); *G06F 2203/0331* (2013.01); *G06T 2207/20021* (2013.01)

(58) Field of Classification Search
CPC ........... G06T 7/246; G06T 2207/20021; G06F 3/017; G06F 3/0346; G06F 2203/0331; G06F 3/0308; G06F 3/0325; G06F 3/0304

See application file for complete search history.

(56) References Cited

U.S. PATENT DOCUMENTS

| | | | | |
|---|---|---|---|---|
| 2014/0022164 | A1* | 1/2014 | Adhikari | G06F 18/2411 |
| | | | | 345/156 |
| 2017/0357332 | A1* | 12/2017 | Balan | G06F 3/017 |
| 2018/0260025 | A1* | 9/2018 | Messingher | G02B 27/0172 |
| 2018/0285636 | A1* | 10/2018 | Fei | G02B 27/017 |
| 2018/0332240 | A1* | 11/2018 | Chen | H04N 5/145 |
| 2019/0026904 | A1* | 1/2019 | Chen | G06T 7/238 |

(Continued)

FOREIGN PATENT DOCUMENTS

| | | |
|---|---|---|
| CN | 109313495 A | 2/2019 |
| CN | 106575159 B | 8/2019 |

(Continued)

OTHER PUBLICATIONS

Corresponding Taiwan office action issued on Feb. 21, 2023.
The office action of the corresponding Taiwanese application No. TW111126692 issued on Jun. 24, 2024.

*Primary Examiner* — Amandeep Saini
*Assistant Examiner* — Daniella M. DiGuglielmo
(74) *Attorney, Agent, or Firm* — CKC & Partners Co., LLC

(57) ABSTRACT

A tracking method, for tracking an object based on a computer vision, includes following steps. A series of images is captured by a tracking camera. A first position of a trackable device is tracked within the images. An object is recognized around the first position in the images. In response to the object being recognized, a second position of the object is tracked in the images.

18 Claims, 8 Drawing Sheets

(56) References Cited

U.S. PATENT DOCUMENTS

2019/0286232 A1* 9/2019 De Nardi ................ G06F 3/017
2019/0311232 A1* 10/2019 Hall ................... G06V 30/2504
2020/0372702 A1* 11/2020 Yan ........................ G06F 3/011

FOREIGN PATENT DOCUMENTS

| | | |
|---|---|---|
| CN | 110275603 A | 9/2019 |
| TW | 201544996 A | 12/2015 |
| TW | 202026853 A | 7/2020 |
| TW | 202111483 A | 3/2021 |
| WO | 2020156854 A1 | 8/2020 |

* cited by examiner

TRACKING SYSTEM, TRACKING METHOD AND NON-TRANSITORY COMPUTER-READABLE STORAGE MEDIUM

RELATED APPLICATIONS

This application claims the priority benefit of U.S. Provisional Application Ser. No. 63/260,069, filed Aug. 9, 2021, which is herein incorporated by reference.

BACKGROUND

Field of Invention

The disclosure relates to a tracking system and a tracking method. More particularly, the disclosure relates to the tracking system and the tracking method able to track a hand movement effectively.

Description of Related Art

Virtual Reality (VR), Augmented Reality (AR), Substitutional Reality (SR), and/or Mixed Reality (MR) devices are developed to provide immersive experiences to users. When a user is wearing a head-mounted display (HMD) device, the visions of the user will be covered by immersive contents shown on the head-mounted display device. The immersive contents show virtual backgrounds and some objects in an immersive scenario.

In some applications, the user may hold a handheld controller as an input device to interact with items in the immersive contents. In some other applications, a tracking system is configured to track hand movements and hand gestures based on a computer vision algorithm, such that users can manipulate directly by their hands. The computer vision algorithm for tracking these hand movements and hand gestures requires a lot of computation resources, and it may cause heavy power consumption.

SUMMARY

The disclosure provides a tracking method, which includes following steps. A series of images is captured by a tracking camera. A first position of a trackable device is tracked within the images. An object is recognized around the first position in the images. In response to the object being recognized, a second position of the object is tracked in the images.

The disclosure provides a tracking system, which includes a tracking system, which includes a trackable device, a tracking camera and a processing unit. The tracking camera is configured to capture images. The processing unit communicates with the tracking camera. The processing unit is configured to receive the images from the tracking camera. The processing unit is further configured to track a first position of a trackable device within the images. The processing unit is further configured to recognize an object around the first position in the images. In response to the object being recognized, the processing unit is further configured to track a second position of the object in the images.

The disclosure provides a non-transitory computer-readable storage medium, storing at least one instruction program executed by a processing unit to perform aforesaid tracking method.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
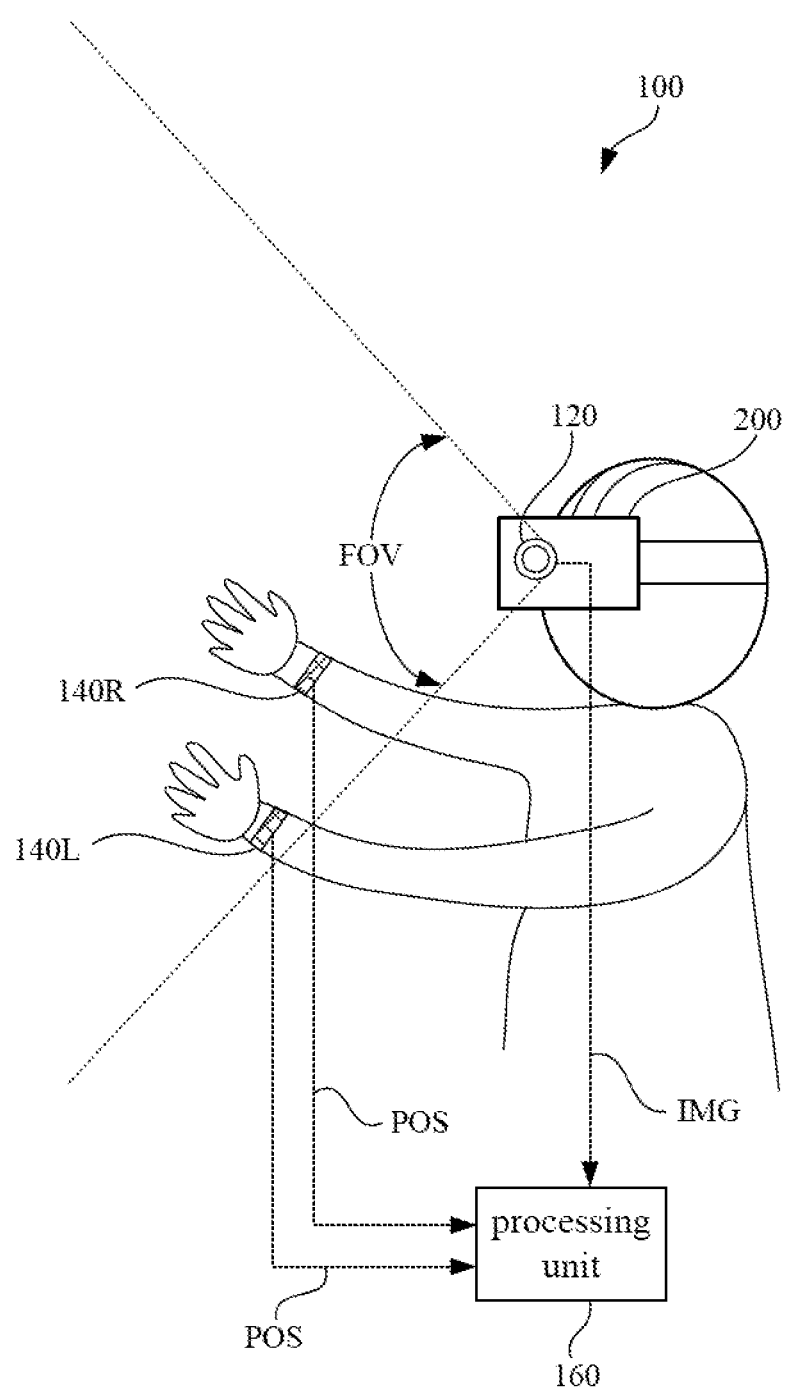
FIG. 1 is a schematic diagram illustrating a tracking system according to an embodiment of this disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which is a schematic diagram illustrating a tracking system 100 according to an embodiment of this disclosure. As shown in FIG. 1, the tracking system 100 includes a tracking camera 120, at least one trackable device and a processing unit 160. In the embodiment shown in FIG. 1, there are two trackable devices 140R and 140L, which are wearable devices (e.g., smart bracelets, smart watches) worn on wrists of a user. The trackable devices 140R and 140L are configured to aid the tracking system 100 in tracking hand movements or hand gestures of the user.

It is noticed that, the trackable devices 140R and 140L in the disclosure are not limited to be worn on the wrists. In some other embodiments, the trackable devices 140R or 140L can be trackable rings worn on fingers of the user, or the trackable devices 140R or 140L can also be trackable gloves worn on palms of the user.

It is also noticed that, the disclosure is not limited to include two trackable devices 140R and 140L worn on both hands. In some other embodiments, the tracking system 100 can include one trackable device worn on one hand of the user, for tracking movements or gesture on this particular hand.

The tracking camera 120 is configured to capture a series of images IMG within a field of view FOV of the tracking camera 120. The images IMG indicate movements of user's hand (and also the trackable devices 140R or 140L). The processing unit 160 is communicatively connected with the tracking camera 120, and the processing unit 160 is configured to receive the images IMG captured by the tracking camera 120 and perform a computer vision algorithm to track and recognize the movements of user's hands (and also the trackable devices 140R or 140L). Details about how to track and recognize the movements of user's hands will be discussed in following paragraphs.

As the embodiment shown in FIG. 1, the tracking camera 120 can be a camera integrated with a head-mounted display (HMD) device 200. In this case, the tracking camera 120 can be disposed on a front side of the head-mounted display (HMD) device 200. In some embodiments, the field of view FOV of the tracking camera 120 can be arranged to the front of the user and suitable to observe the movements of user's hands.

In some embodiments, the processing unit 160 can be a processor, a graphic processing unit (GPU), an application specific integrated circuit (ASIC) or any similar processing components. In some embodiments, the processing unit 160 can be integrated with the head-mounted display (HMD) device 200. In other embodiments, the processing unit 160 can be disposed in a computer, a tablet computer, a server, a smartphone or any similar computing device.

Figure 2:
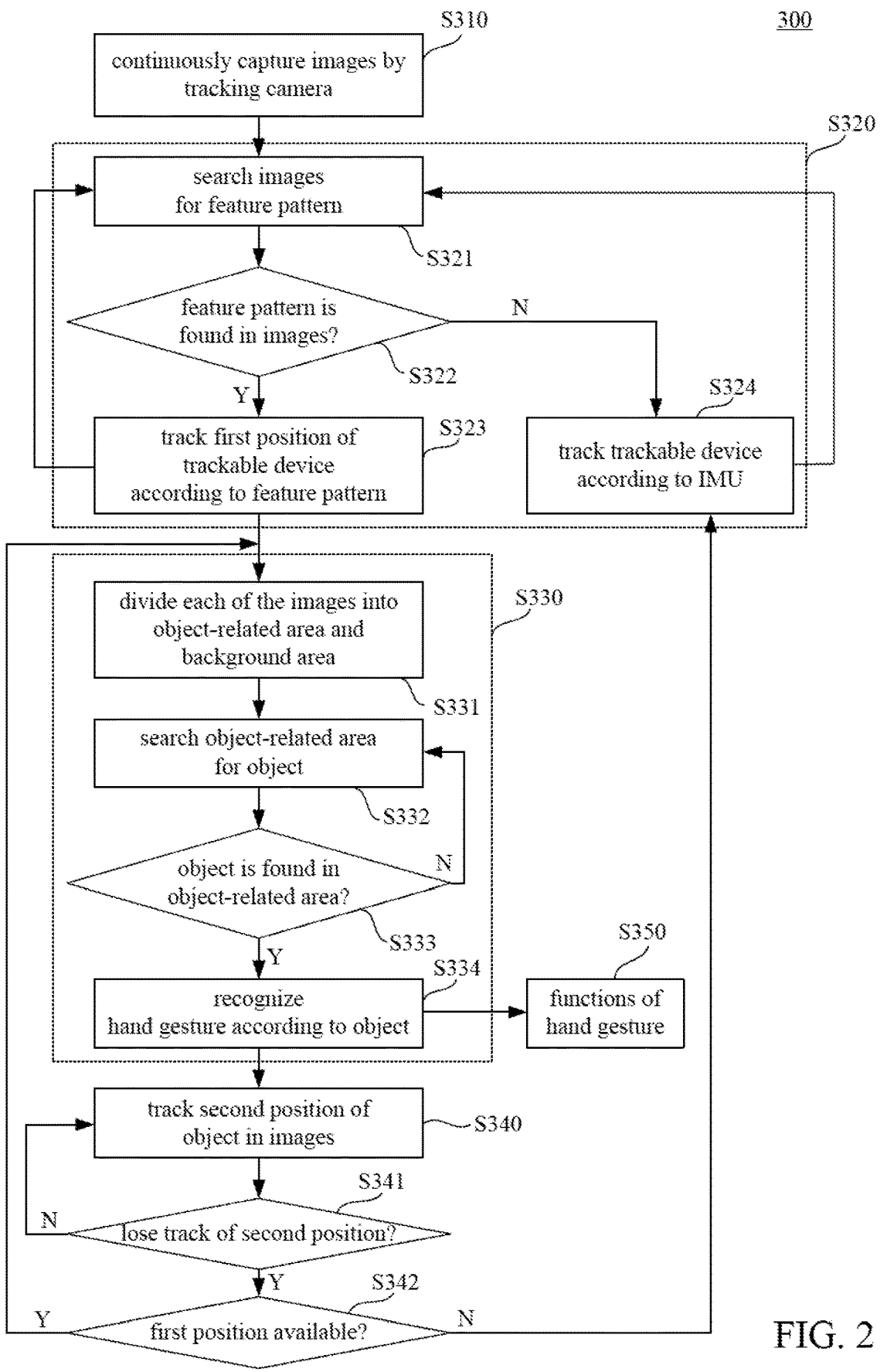
FIG. 2 is a flowchart illustrating a tracking method according to some embodiments of the disclosure.

Reference is further made to FIG. 2, which is a flowchart illustrating a tracking method 300 according to some embodiments of the disclosure. The tracking method 300 can be performed by the tracking system 100 shown in FIG. 1. As shown in FIG. 2, step S310 is executed by the tracking camera 120, to capture a series of images IMG continuously. In some embodiments, the processing unit 160 is configured to trigger the tracking camera 120 to capture the images IMG in step S310.

Figure 3:
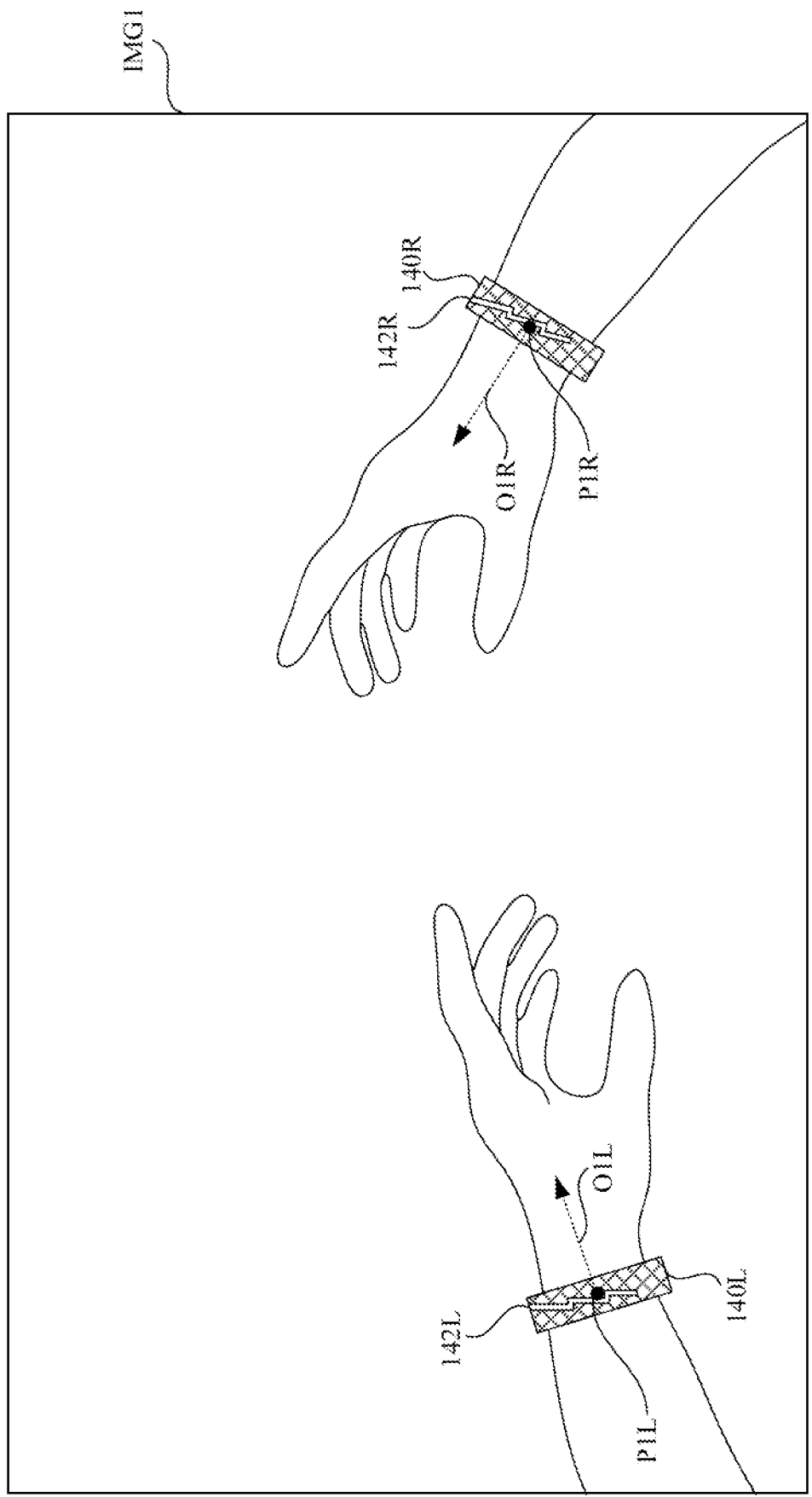
FIG. 3 is a schematic diagram illustrating one exemplary image of the images captured by the tracking camera according to some embodiments of the disclosure.

Reference is further made to FIG. 3, which is a schematic diagram illustrating one exemplary image IMG1 of the images IMG captured by the tracking camera 120.

As shown in FIG. 3, the image IMG1 show two hands of the user and the trackable devices 140R or 140L worn on both hands. The trackable device 140R includes a feature pattern 142R on a surface of the trackable device 140R. In some embodiments, the feature pattern 142R is a light-emitting pattern, and correspondingly the trackable device 140R includes a light-emitting unit configured for generating the light-emitting pattern (the feature pattern 142R) on the surface of the trackable device 140R.

In some other embodiments, the feature pattern 142R can be a colored pattern printed on the surface of the trackable device 140R. For example, the feature pattern 142R can be a yellow lightening icon printed on a black outer case of the trackable devices 140R.

Similarly, the trackable device 140L also includes another feature pattern 142L on a surface of the trackable device 140L.

The feature patterns 142R/142L can include specific icons, drawings, figures or colors to achieve strong distinguishable features, which are optimized to be recognized by the computer vision algorithm.

As shown in FIG. 1, FIG. 2 and FIG. 3, in step S320, the processing unit 160 is configured to track a first position P1R of the trackable device 140R (and another first position P1L of the trackable device 140L) within the image IMG1. As shown in FIG. 2, step S320 includes further steps S321 to S324.

The tracking system 100 and the tracking method 300 will perform similar manners to track the trackable device 140R and the trackable device 140L. For brevity, in following embodiments, details operations for the trackable device 140R will be discussed for demonstration. The tracking system 100 and the tracking method 300 can adopt similar steps to the trackable device 140L, and details about the trackable device 140L is not discussed below.

As mentioned above, the trackable device 140R includes the feature pattern 142R. In step S321, the processing unit 160 is configured to search the image IMG1 for the feature pattern 142R based on the computer vision algorithm.

It is noticed that, the feature pattern 142R is searched over the whole image IMG1 in step S321. Compared with directly recognizing features of user's hands (e.g., recognizing fingers, palms, wrists, skin colors) from the image IMG1, recognizing feature pattern 142R is much easier task for the computer vision algorithm. Because, the feature pattern 142R can be designed with special shapes or the feature pattern 142R may emit optical signals with special tempos, such that the feature pattern 142R is easier to be recognized. However, the hand of the user may do different gestures (e.g., holding, pinching, pointing, grasping, typing, pressing, or dropping gestures), such that shapes or contours of the hands appeared in the image IMG1 may change dramatically. To search the hand directly through the whole image IMG1 will be a harder task for the processing unit 160 and the computer vision algorithm.

In step S322, the processing unit 160 determines whether the feature pattern 142R is found in the image IMG1 or not. If the feature pattern 142R is found, step S323 is executed, to track the first position P1R of the trackable device 140R according to the feature pattern 142R found in the image IMG1, as shown in FIG. 3. As the tracking camera 120 continuously capture the series of images IMG, the tracking method 300 can keep tracking the first position P1R of the trackable device 140R in the series of images IMG by repeating steps S321 to S323.

It is noticed that, in some embodiments, based on a direction and a contour of the feature pattern 142R found in the image IMG1, the tracking method 300 further detects an orientation O1R of the trackable device 140R in the space as shown in FIG. 3. For example, the tracking method 300 can detect three rotational angles of the orientation O1R relative to a three-dimensional coordinate system, according to the feature pattern 142R found in the image IMG1. In some embodiments, during step S323, the tracking method 300 is able to track the first position P1R and the orientation O1R of the trackable device 140R according to the feature pattern 142R found in the image IMG1. Similarly, during step S323, if the feature pattern 142L is found, step S323 is executed, to track the first position P1L and/or an orientation O1L of the trackable device 140L according to the feature pattern 142L found in the image IMG1 as shown in FIG. 3.

On the other hand, if the feature pattern 142R is not detected in the image, step S324 is executed by the processing unit 160, to track the trackable device 140R according to pose data generated by an inertial measurement unit (IMU) embedded in the trackable device 142R. More details about step S324 will be discussed later.

Based on the first position P1R detected in the image IMG1, step S330 is executed by the processing unit 160, to recognize an object around the first position P1R in the image IMG1. In some embodiments, the object in this embodiment is one hand of the user. One function of the tracking system 100 and the tracking method 300 is to track/recognize a hand gesture of the user. The first position P1R of the trackable device 140R tracked in step S320 is helpful to decide a potential location of user's hand. Step S330 of the tracking method 300 in FIG. 2 include further steps S331 to S334.

Figure 4:
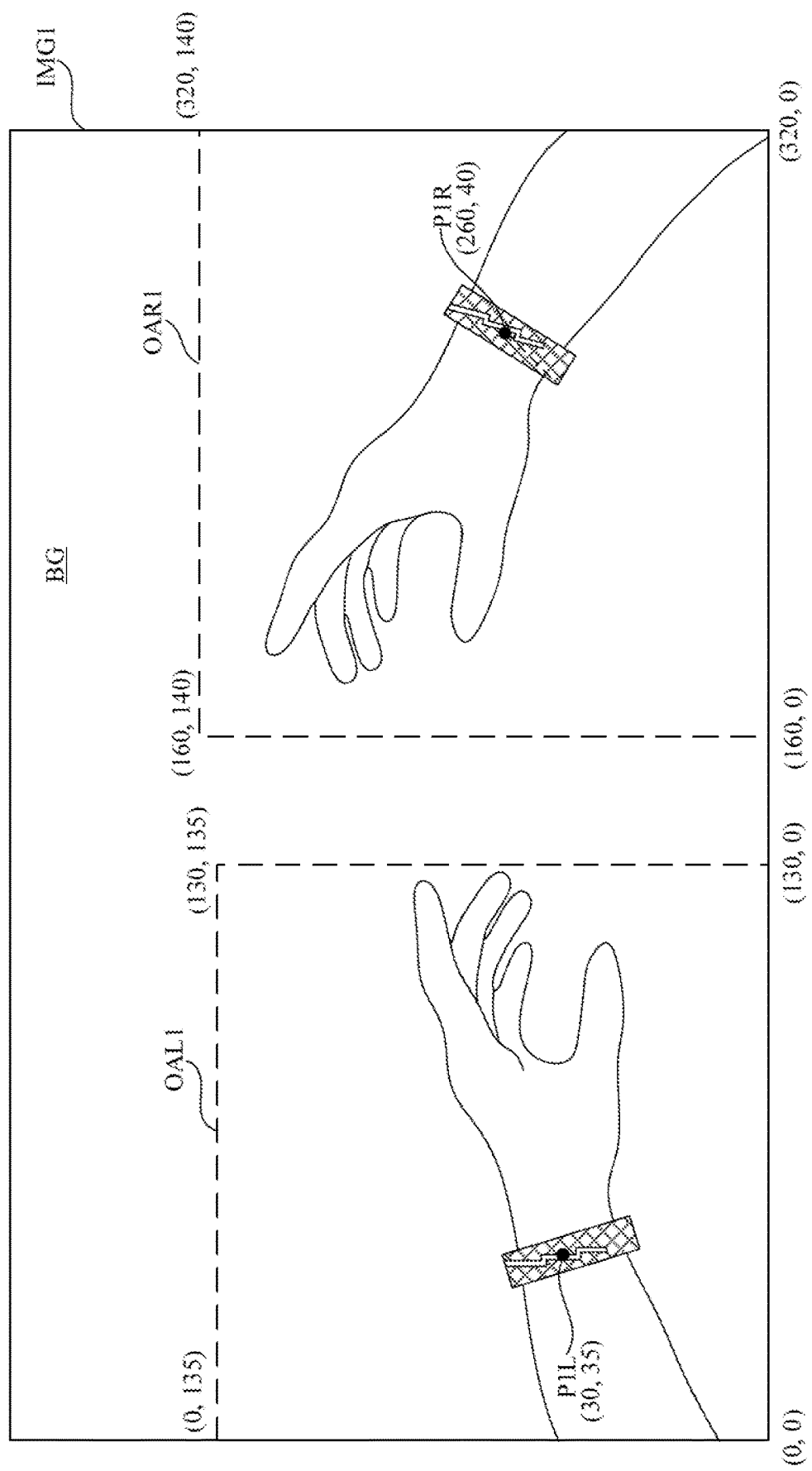
FIG. 4 is a schematic diagram illustrating the image in FIG. 3 processed by the tracking method according to an embodiment of the disclosure.

In step S331, the processing unit 160 divides each of the images IMG into at least one object-related area adjacent to the first position(s) and a background area. Reference is further made to FIG. 4, which is a schematic diagram illustrating the image IMG1 in FIG. 3 processed in step S331 according to an embodiment of the disclosure. As shown in FIG. 4, the image IMG1 is divided in step S331 into an object-related area OAR1 adjacent to the first position P1R, another object-related area OAL1 adjacent to the first position P1L and a background area BG. As shown in FIG. 4, the object-related area OAR1 is located in a region adjacent to the first position P1R. For example, if coordinates of the first position P1R is (260, 40), the object-related area OAR1 can be arranged at +100 pixels to −100 pixels around (260, 40), such that the object-related area OAL1 is formed as a rectangle with four corners (160, 0), (320, 0), (320, 140) and (160, 140).

As shown in FIG. 4, the object-related area OAL1 is located in a region adjacent to the first position P1L. For example, if coordinates of the first position P1L is (30, 35), the object-related area OAL1 can be arranged at +100 pixels to −100 pixels around (30, 35), such that the object-related area OAL1 is formed as a rectangle with four corners (0, 0), (130, 0), (0, 135) and (130, 135).

In step S332, the processing unit 160 is configured to search the object-related area OAR1 and the object-related area OAL1 in the image IMG1 for the object (e.g., the right hand and the left hand) based on the computer vision algorithm.

In this case, the computer vision algorithm is not performed in the background area BG of the image IMG1. Compared with searching the whole image IMG1 for the object (e.g., user's hand), searching regions in step S332 is narrowed down to the object-related area OAR1 and the object-related area OAL1, and it will increase efficiency in searching the object.

In embodiments shown in FIG. 4, the object-related area OAR1 and the object-related area OAL1 are determined according to the first positions P1R/P1L. The disclosure is not limited thereto. In some other embodiments, the object-related areas are determined according to the first positions and an inverse kinematics (IK) algorithm.

Figure 5:
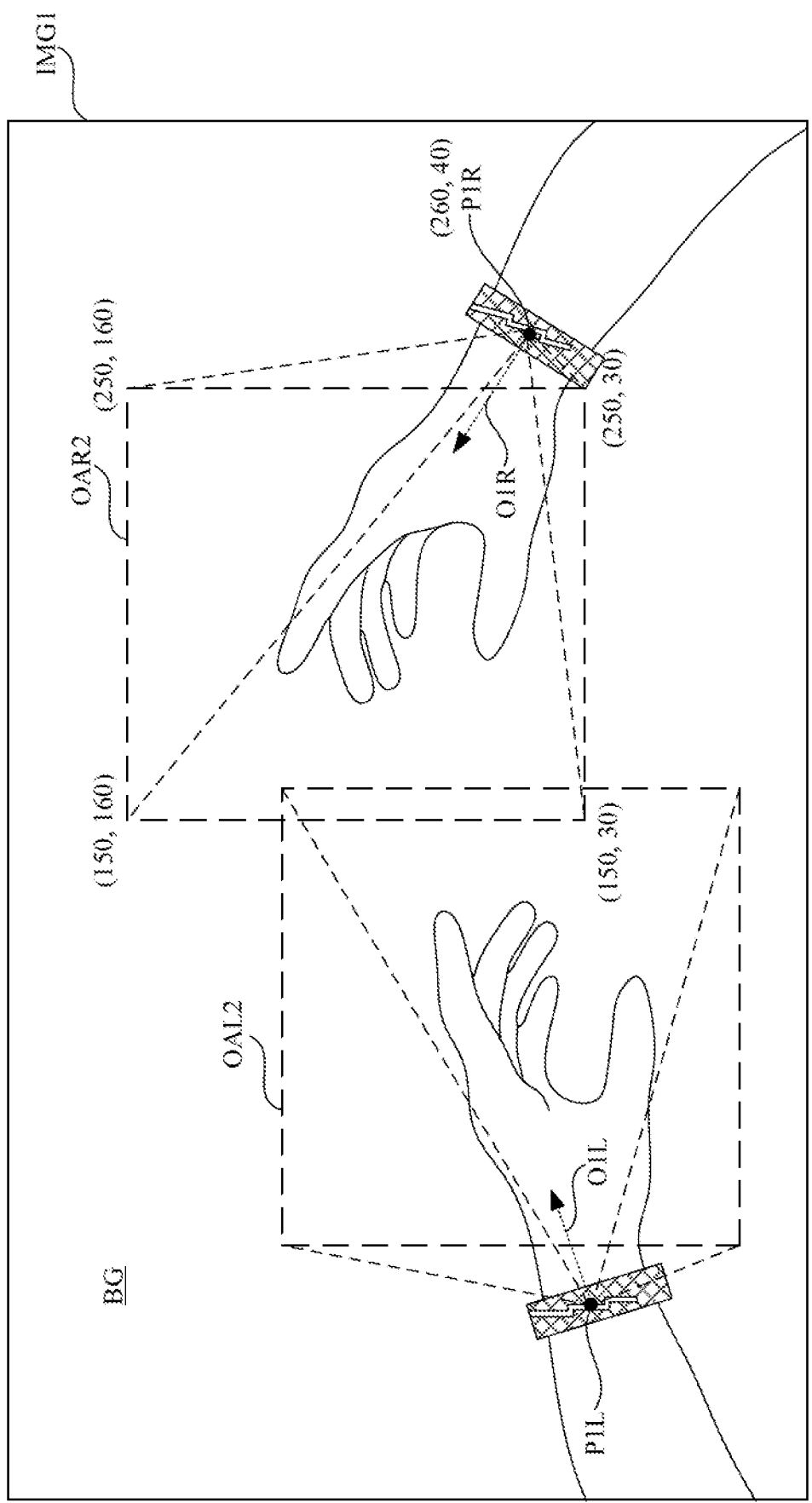
FIG. 5 is a schematic diagram illustrating the image in FIG. 3 processed by the tracking method considering the inverse kinematics (IK) algorithm according to an embodiment of the disclosure.

Reference is further made to FIG. 5. FIG. 5 is a schematic diagram illustrating the image IMG1 in FIG. 3 processed in step S331 considering the inverse kinematics (IK) algorithm according to an embodiment of the disclosure.

As mentioned above, during step S323, the tracking method 300 is able to track the first position P1R and also the orientation O1R of the trackable device 140R according to the feature pattern 142R found in the image IMG1, and also track the first position P1L and also the orientation O1L of the trackable device 140L according to the feature pattern 142L found in the image IMG1. The orientation O1R of the trackable device 140R is able to indicate a direction of the right hand of the user. As shown in FIG. 5, based on the orientation O1R in reference with the inverse kinematics (IK) algorithm, the tracking method 300 is able to recognize that the right hand of the user extends inwardly to a left-top side of the first position P1R.

As shown in FIG. 5, the image IMG1 is divided in step S331 into an object-related area OAR2, another object-related area OAL2 and the background area BG. In this embodiments, the object-related area OAR2 is determined by the processing unit 160 according to the first position P1R, the orientation O1R and the inverse kinematics (IK) algorithm.

In step S332, the processing unit 160 is configured to search the object-related area OAR2 for the object (e.g., the right hand of user). Because the trackable device 140R is worn on the right wrist of the user and located at the first position P1R, according to the orientation O1R and the inverse kinematics (IK) algorithm, the object-related area OAR2 can be narrowed down to the left-top side of the first position P1R. As shown in FIG. 5, the object-related area OAR2 is formed as a rectangle with four corners (150, 30), (250, 30), (150, 160) and (250, 160). It is noticed that the object-related area OAR2 in FIG. 5 considering the orientation O1R and the inverse kinematics (IK) algorithm is smaller than the object-related area OAR1 in FIG. 4 without considering the orientation O1R and the inverse kinematics (IK). Therefore, it will increase the searching efficiency by searching the object within the object-related area OAR2. The object searching in step S332 can be completed in a shorter computing time with lower power consumption. In addition, the object searching in step S332 can increase an accuracy of the object searching (by ignoring irreverent data in the background).

Similarly, in step S332, the processing unit 160 is configured to search the object-related area OAL2 for the object (e.g., the left hand of user). Because the trackable device 140L is worn on the left wrist of the user and located at the first position P1L, according to the orientation O1L and the inverse kinematics (IK) algorithm, the object-related area OAL2 can be narrowed down to the right-top side of the first position P1L.

Figure 6:
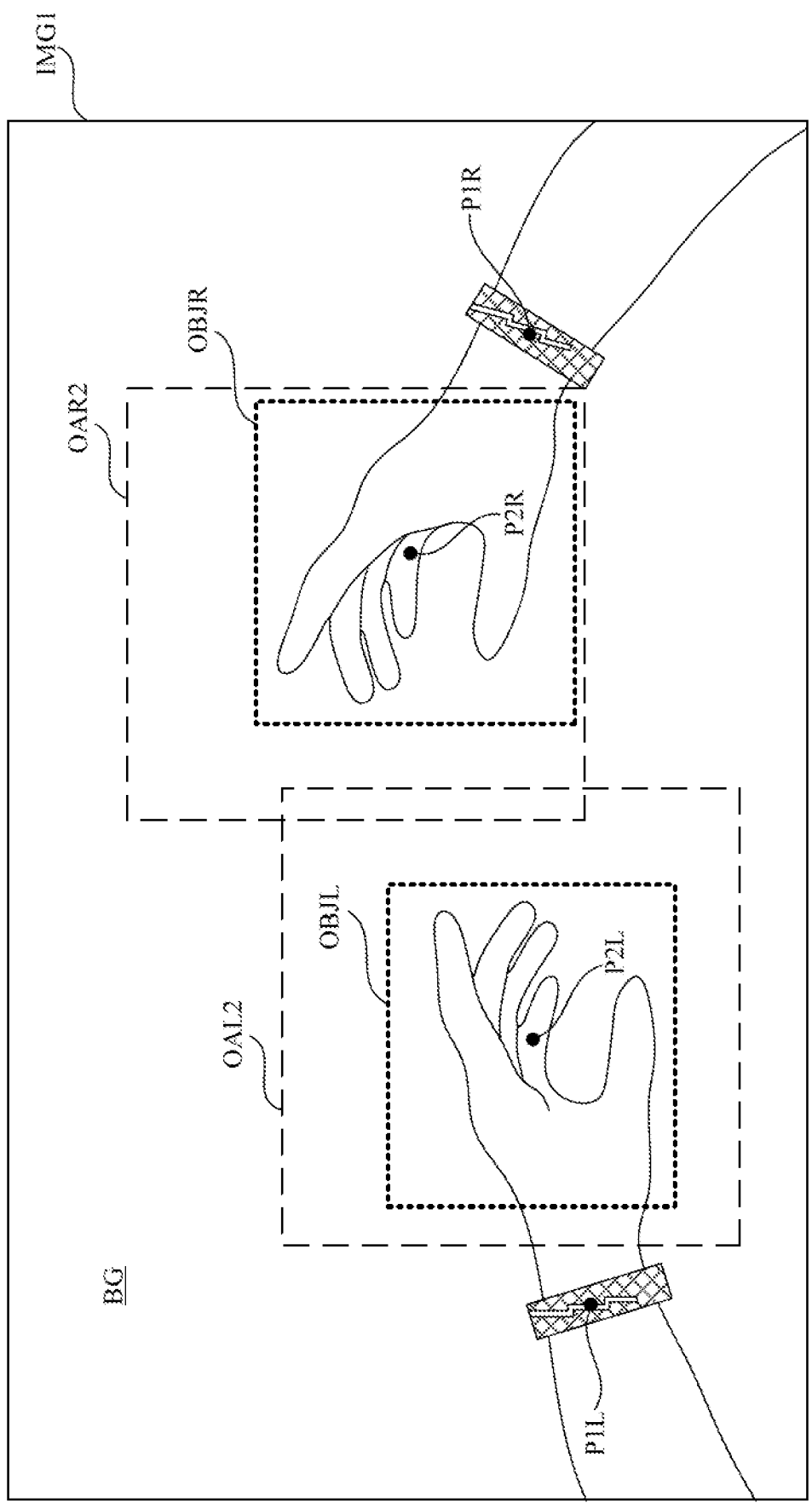
FIG. 6 is a schematic diagram illustrating the image in FIG. 3 processed by the tracking method according to an embodiment of the disclosure.

In step S333, the processing unit determines whether the object is found in the object-related area (referring to OAR1/OAL1 in FIG. 4 or the OAR2/OAL2 in FIG. 5) or not. Reference is further made to FIG. 6, which is a schematic diagram illustrating the image IMG1 in FIG. 3 processed in steps S333 to S340 according to an embodiment of the disclosure.

As shown in FIG. 6, when the object OBJR is found, step S334 is executed, to recognize a hand gesture according to the object OBJR found in the image IMG1, as shown in FIG. 6. The hand gesture about the object OBJR can be selected from one of holding, pinching, pointing, grasping, typing, pressing and dropping gestures.

After the hand gesture is recognized according to the object OBJR, step S350 is executed by the processing unit 160, to perform related functions of the recognized hand gesture. For example, when the recognized hand gesture is pressing a virtual button in an immersive content shown by the head-mounted display device 200, the processing unit 160 can activate the function of the virtual button. For example, when the recognized hand gesture is typing a virtual keyboard in an immersive content shown by the head-mounted display device 200, the processing unit 160 can activate the typing function relative to the virtual keyboard.

On the other hand, when the object is not found in step S333, the tracking method 300 can returns to step S332 to search the object-related area again.

In step S330, the object OBJR has been recognized around the first position P1R in the image IMG1. Afterward, step S340 is executed by the processing unit 160 to track the second position P2R of the object OBJR in the image IMG1 as shown in FIG. 6. A center position of the object OBJR is regarded as the second position P2R. As the tracking camera 120 continuously capture the series of images IMG, the tracking method 300 can keep tracking the second position P2R of the object OBJR in the series of images IMG by repeating steps S320 to S340. Similarly, the tracking method 300 can keep tracking the second position P2L of the object OBJL in the series of images IMG by repeating steps S320 to S340.

In an ideal case, the tracking system 100 and the tracking method 300 can keep tracking the second position P2R of the object OBJR in the series of images IMG captured by the tracking camera 120.

However, in some cases, the tracking system 100 and the tracking method 300 may lose track of the second position P2R of the object OBJR. For example, the object OBJR can be blocked by other items (e.g., when the user place his/her hand under a table, and the hand may be blocked by a table from the tracking camera 120), or the object OBJR can be moved outside the field of view FOV of the tracking camera 120 (e.g., when users move to their hands behind their heads or place them on their ears, their hands may be out of the field of view FOV shown in FIG. 1).

As shown in FIG. 2, step S341 is executed by the processing unit 160, to determine whether the tracking method 300 loses track of the second position P2R or not. If the second position P2R of the object OBJR is still trackable, the tracking method 300 returns to step S340 and keeps tracking the second position P2R of the object OBJR.

If the second position P2R of the object OBJR is currently not trackable, step S342 is executed by the processing unit 160, to determine whether the first position of the trackable device 140R is currently available or not.

Figure 7:
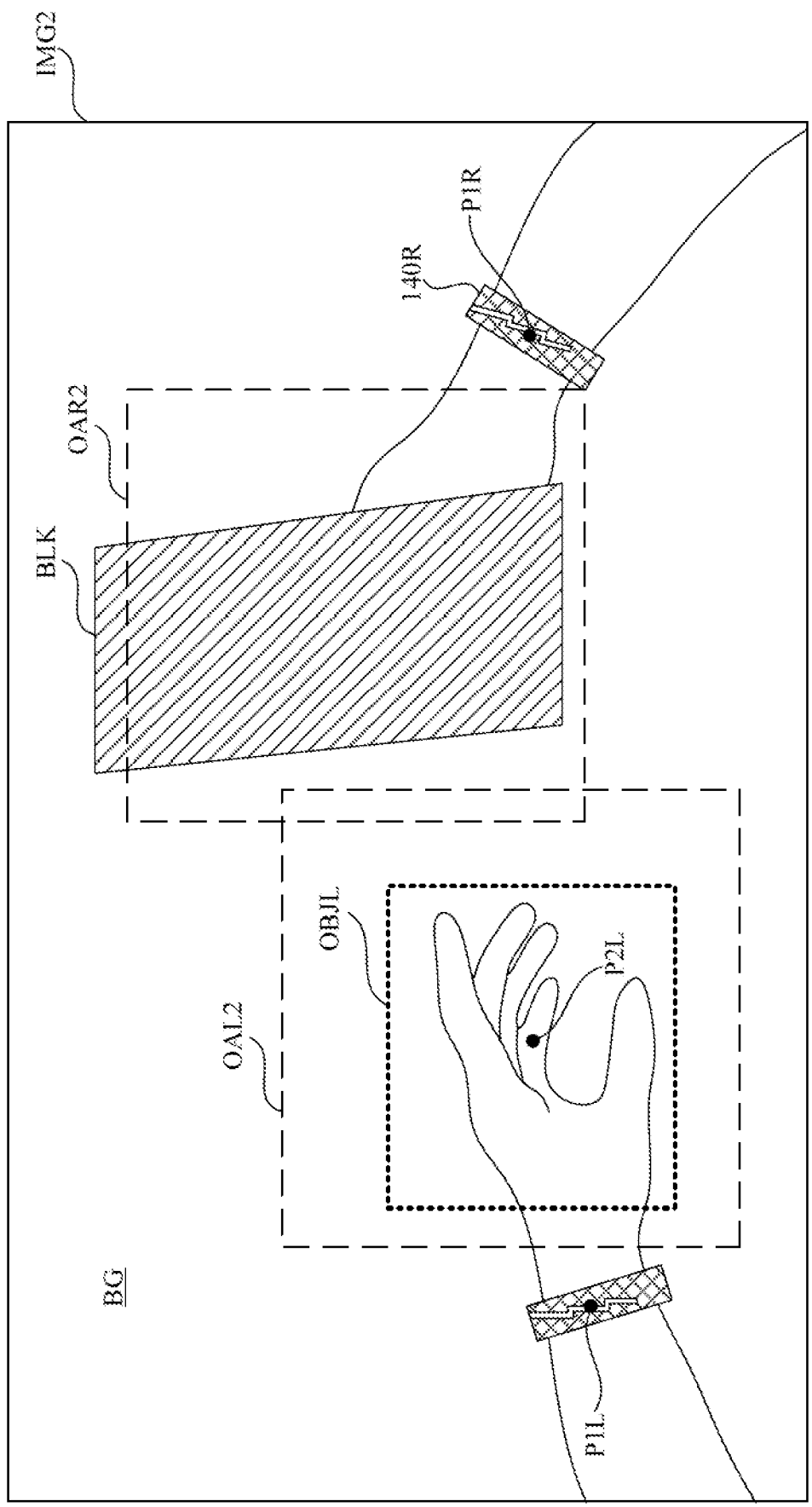
FIG. 7 is a schematic diagram illustrating an image captured by a tracking camera according to an embodiment of the disclosure.

Reference is further made to FIG. 7, which is a schematic diagram illustrating an image IMG2 captured by the tracking camera 120 when the second position is not trackable and the first position is available according to an embodiment of the disclosure.

As shown in FIG. 7, the right hand of the user is located under an item BLK. In this case, the right hand is blocked by an item BLK in the image IMG2, such that the right hand of the user is currently not trackable in view of the tracking camera 120. In the meantime, the first position P1R of the trackable device 140R is still available. In this case, the tracking method 300 returns to step S330. In step S330, the tracking method 300 will keep trying to recognize the object around the first position P1R. Once the object (the right hand) is visible or trackable again in a following image, the tracking method 300 can resume the object tracking around the first position P1R immediately.

Figure 8:
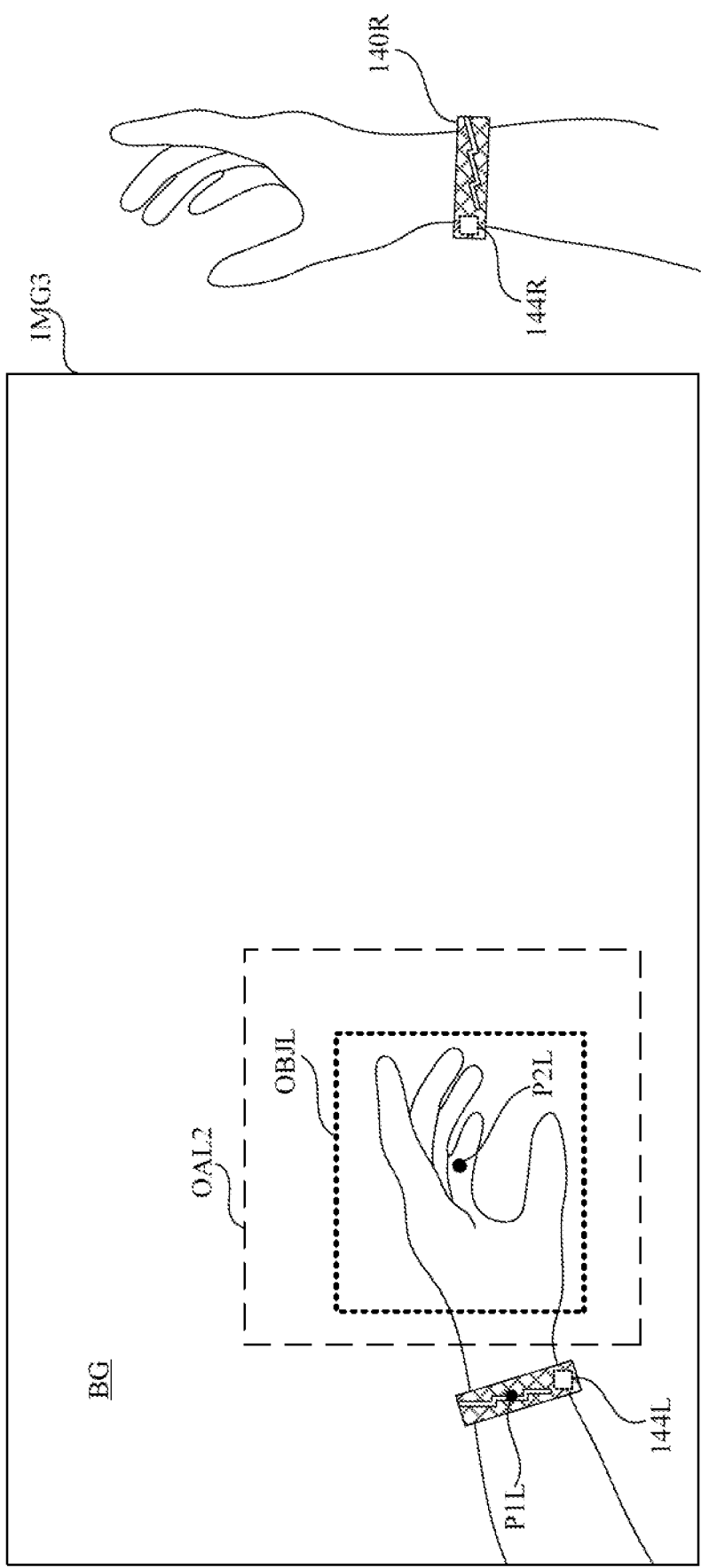
FIG. 8 is a schematic diagram illustrating another image captured by a tracking camera according to an embodiment of the disclosure.

Reference is further made to FIG. 8, which is a schematic diagram illustrating an image IMG3 captured by the tracking camera 120 when the second position is not trackable and the first position is unavailable according to an embodiment of the disclosure.

As shown in FIG. 8, the right hand of the user is located outside the field of view FOV (referring to FIG. 1) of the tracking camera 120. When the object is out of the field of view FOV, the object is regarded to enter a dead zone of the tracking camera 120. The right hand and the corresponding trackable device 140R do not appear in the image IMG3. In this case, the tracking camera 120 is not able to track the right hand and the corresponding trackable device 140R. Therefore, the tracking method 300 is not able to recognize the first position of the trackable device 140R in the image IMG3.

When the tracking method 300 loses track of the second position and the first position is unavailable, the tracking method 300 returns to S324, to track the trackable device according to pose data POS generated by an inertial measurement unit (IMU) 144R embedded in the trackable device 140R.

In some embodiments, as shown in FIG. 8, the trackable device 140R includes one inertial measurement unit 144R, and the trackable device 140L includes one inertial measurement unit 144L. The inertial measurement unit 144R in the trackable device 140R is an electronic component that measures accelerations, angular rates and orientation of the trackable device 140R. The inertial measurement unit 144R can be realized by an accelerometer, a gyroscope, and/or a magnetometer. The inertial measurement unit 144L in the trackable device 140L has similar functions.

As shown in FIG. 1 and FIG. 8, when the right hand enters the dead zone of the tracking camera 120, the right hand is not trackable according to the image IMG3. In this case, the inertial measurement unit 144R is able to detect accelerations, angular rates and orientation and generate pose data. The pose data is related to a movement of the right hand. The pose data can be transmitted from the trackable device 140R to the processing unit 160. The processing unit 160 can track an approximate position of the trackable device 140R according to the pose data POS. Once the object (the right hand) moves into the field of view FOV (referring to FIG. 1) of the tracking camera 120 and the object is visible or trackable again in a following image, the tracking method 300 can resume the object tracking immediately.

Another embodiment of the disclosure includes a non-transitory computer-readable storage medium, which stores at least one instruction program executed by a processing unit 160 to perform tracking methods 300 as shown in FIG. 2.

Based on aforesaid embodiments, the tracking system 100 searches the whole images for the trackable devices 140R/140L with strong feature patterns 142R/142L (easier to distinguish/recognize) to estimate the object-related areas. Then, the tracking system 100 search with the object-related areas (instead of the whole images) for recognizing the objects. Therefore, the tracking system 100 and the tracking method 300 are able to track a hand movement and a hand gesture effectively in a shorter computing time, with a higher accuracy and adaptable in various applications. The hand movement or the hand gesture recognized by the tracking system 100 can be utilized as an input signal to control an application program, to trigger a function, to turn on/off a switch, or to perform other following operations.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A tracking method, comprising:
   capturing a plurality of images by a tracking camera;
   tracking a first position of a trackable device within the images;
   using the previously tracked first position of the trackable device to determine an object-related area in a region adjacent to the first position;

recognizing an object in the object-related area around the first position of the trackable device in the images; and in response to the object being recognized, tracking a second position of the object in the images;

wherein the step of recognizing the object in the object-related area around the first position of the trackable device comprises:

dividing each of the images into the object-related area adjacent to the first position of the trackable device and a background area; and searching the object-related area in each of the images for the object based on a computer vision algorithm.

2. The tracking method of claim 1, wherein a feature pattern is disposed on a surface of the trackable device, the step of tracking the first position of the trackable device comprises:

searching the images for the feature pattern based on the computer vision algorithm.

3. The tracking method of claim 2, wherein the step of tracking the first position of the trackable device further comprises:

in response to the feature pattern being detected in the images, tracking the first position of the trackable device according to coordinates of the feature pattern in the images; and in response to the feature pattern not being detected in the images, tracking the trackable device outside the images according to pose data generated by an inertial measurement unit disposed in the trackable device.

4. The tracking method of claim 1, wherein the computer vision algorithm is not performed in the background area of the images.

5. The tracking method of claim 1, further comprising:

tracking an orientation of the trackable device according to a feature pattern on the trackable device within the images, wherein the object-related area is determined according to the first position of the trackable device, the orientation and an inverse kinematics algorithm.

6. The tracking method of claim 1, wherein the trackable device is a wearable device worn on a wrist or a finger on a user, the object is one hand of the user, and the step of recognizing the object comprises:

recognizing a hand gesture according to the object, wherein the hand gesture comprises holding, pinching, pointing, grasping, typing, pressing or dropping.

7. The tracking method of claim 1, further comprising:

in response to losing track of the second position and the first position of the trackable device being unavailable, tracking the trackable device according to pose data generated by an inertial measurement unit disposed in the trackable device.

8. The tracking method of claim 1, further comprising:

in response to losing track of the second position and the first position of the trackable device being available, returning to recognize the object around the first position of the trackable device.

9. A tracking system, comprising:

a trackable device;

a tracking camera, configured to capture a plurality of images;

a processor, in communication with the tracking camera, wherein the processor is configured to:

receive the images from the tracking camera;

track a first position of the trackable device within the images;

using the previously tracked first position of the trackable device to determine an object-related area in a region adjacent to the first position;

recognize an object in the object-related area around the first position of the trackable device in the images; and in response to the object being recognized, track a second position of the object in the images;

wherein the processor is further configured to:

divide each of the images into an object-related area adjacent to the first position of the trackable device and a background area; and search the object-related area in each of the images for the object by a computer vision algorithm.

10. The tracking system of claim 9, wherein the trackable device comprises a feature pattern on a surface of the trackable device, the processor searches the images for the feature pattern to track the first position of the trackable device based on the computer vision algorithm.

11. The tracking system of claim 10, wherein the trackable device comprises an inertial measurement unit, the processor is configured to track the first position of the trackable device according to coordinates of the feature pattern in the images in response to the feature pattern being detected in the images, and the processor is configured to track the trackable device outside the images according to pose data generated by the inertial measurement unit in response to the feature pattern not being detected in the images.

12. The tracking system of claim 9, wherein the computer vision algorithm is not performed in the background area of the images.

13. The tracking system of claim 9, wherein the processor is further configured to track an orientation of the trackable device according to a feature pattern on the trackable device within the images, the processor determines the object-related area according to the first position of the trackable device, the orientation and an inverse kinematics algorithm.

14. The tracking system of claim 9, wherein the trackable device is a wearable device worn on a wrist or a finger on a user, the object is one hand of the user, and the processor is configured to recognize a hand gesture of the user, the hand gesture comprises holding, pinching, pointing, grasping, typing, pressing or dropping.

15. The tracking system of claim 9, wherein in response to the object moving out of the images, the processor tracks the trackable device according to pose data generated by an inertial measurement unit disposed in the trackable device.

16. The tracking system of claim 9, wherein in response to losing track of the second position of the object, the processor returns to recognize the object around the first position of the trackable device.

17. The tracking system of claim 9, wherein the tracking camera is disposed on a head-mounted display device to track a hand gesture.

18. A non-transitory computer-readable storage medium, storing at least one instruction program executed by a processor to perform a tracking method, the tracking method comprising:

triggering a tracking camera to capture a plurality of images;

tracking a first position of a trackable device within the images;

using the previously tracked first position of the trackable device to determine an object-related area in a region adjacent to the first position;

recognizing an object in the object-related area around the first position of the trackable device in the images; and in response to the object being recognized, tracking a second position of the object in the images;

wherein the step of recognizing the object in the object-related area around the first position of the trackable device comprises:

dividing each of the images into the object-related area adjacent to the first position of the trackable device and a background area; and searching the object-related area in each of the images for the object based on a computer vision algorithm.

* * * * *